United States Patent
Riazantsev et al.

(10) Patent No.: US 8,523,526 B2
(45) Date of Patent: Sep. 3, 2013

(54) COOLED BLADE FOR A GAS TURBINE

(75) Inventors: Sergei Riazantsev, Nussbaumen (CH); Thomas Wilhelm, Zürich (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/115,505

(22) Filed: May 25, 2011

(65) Prior Publication Data

US 2011/0268582 A1 Nov. 3, 2011

Related U.S. Application Data

(63) Continuation of application No. PCT/EP2009/065353, filed on Nov. 18, 2009.

(30) Foreign Application Priority Data

Nov. 26, 2008 (CH) ...................................... 1846/08

(51) Int. Cl.
*F01D 5/18* (2006.01)

(52) U.S. Cl.
USPC ........................ 416/96 R; 416/193 A; 416/239

(58) Field of Classification Search
USPC ............. 415/115; 416/239, 243, 193 A, 500, 416/96 R, 95, 96 A, 97 R
See application file for complete search history.

(56) References Cited

U.S. PATENT DOCUMENTS

| 3,045,965 | A | * | 7/1962 | Bowmer | 416/97 R |
| 3,749,514 | A | | 7/1973 | Kelch et al. | |
| 3,918,835 | A | | 11/1975 | Yamarik et al. | |
| 4,177,010 | A | * | 12/1979 | Greaves et al. | 416/97 R |
| 4,784,573 | A | | 11/1988 | Ress, Jr. | |
| 4,940,388 | A | | 7/1990 | Lilleker et al. | |
| 6,769,879 | B1 | * | 8/2004 | Cleveland et al. | 416/243 |
| 6,808,368 | B1 | * | 10/2004 | Tomberg et al. | 416/223 A |
| 6,832,897 | B2 | * | 12/2004 | Urban | 416/223 A |
| 6,874,987 | B2 | * | 4/2005 | Slinger et al. | 415/115 |
| 6,923,616 | B2 | * | 8/2005 | McRae et al. | 415/115 |
| 7,264,445 | B2 | | 9/2007 | Naik et al. | |
| 2005/0031449 | A1 | * | 2/2005 | Cleveland et al. | 416/97 R |
| 2005/0095128 | A1 | * | 5/2005 | Benjamin et al. | 416/97 R |

(Continued)

FOREIGN PATENT DOCUMENTS

| EP | 1772592 A2 | 4/2007 |
| GB | 1561229 A | 2/1980 |

OTHER PUBLICATIONS

T. Sourmail "Coatings for Turbine Blades" University of Cambridge Website, Jun. 5, 2006, pp. 1-25, X7908701 http://www.msm.cam.ac.uk/phase-trans/2003/Superalloys/coatings/index.html.

*Primary Examiner* — Christopher Verdier
(74) *Attorney, Agent, or Firm* — Volpe and Koenig, P.C.

(57) ABSTRACT

A blade for a gas turbine, is provided and includes a blade airfoil which extends in a blade longitudinal direction and at the lower end merges into a shank which terminates in a blade root for fastening the blade on a blade carrier, particularly on a rotor disk. Devices for cooling the blade, which are supplied with a cooling medium, especially cooling air, via a feed hole arranged on the shank at the side, are arranged inside the blade airfoil. In the region of the feed hole provision is made for a planar stiffening element which reaches beyond the immediate region of the feed hole for reducing peaks of mechanical stress.

4 Claims, 2 Drawing Sheets

(56) References Cited

U.S. PATENT DOCUMENTS

2005/0111978 A1\* 5/2005 Strohl et al. ................ 416/97 R
2005/0186074 A1\* 8/2005 Tomita et al. ............... 416/97 R
2007/0253815 A1\* 11/2007 Kopmels et al. ............ 416/97 R \* cited by examiner

COOLED BLADE FOR A GAS TURBINE

CROSS REFERENCE TO RELATED APPLICATIONS

This application is a continuation of International Application No. PCT/EP2009/065353 filed Nov. 18, 2009, which claims priority to Swiss Patent Application No. 01846/08, filed Nov. 26, 2008, the entire contents of all of which are incorporated by reference as if fully set forth.

FIELD OF INVENTION

The present invention relates to the field of gas turbines. Specifically, it refers to a blade for a gas turbine.

BACKGROUND

Cooled blades for gas turbines, in which the cooling air, which is guided inside the blade airfoil in convoluted cooling passages, is fed by means of a feed hole arranged on the blade shank, are known, for example, from U.S. Pat. No. B2-7,264,445, which is incorporated by reference. Such feeds can also open into the outside space at the side on the shank (see, for example, U.S. Pat. No. 4,940,388, which is also incorporated by reference).

The feed holes in the shank of the blade create mechanical stress concentrations on the edges, which can be detrimental to the service life of the blade. In highly loaded blades, as are used in turbines of large aircraft, for example, measures are therefore taken to reduce these stress peaks on the edges of the hole openings. Such a measure is to provide for example on the shank 20, according to FIG. 2, around the feed hole 21, a bead 22 which encompasses the opening. Such a blade is described in an article by T. Sourmail, "Coatings for Turbine Blades", University of Cambridge, in the section "Coatings" on p. 6.

The stress-reducing bead around the opening of the feed hole leads to an increase of the service life, but, on account of its localization, has practically no effect upon the vibration behavior of the blade. It would, however, be desirable to achieve an additional improvement in the vibration behavior.

SUMMARY

The present disclosure is directed to a blade for a gas turbine, including a blade airfoil which extends in a blade longitudinal direction and at a lower end merges into a shank which terminates in a blade root for fastening the blade on a blade carrier. Devices for cooling the blade, which are supplied with a cooling medium, via a feed hole arranged on the shank at a side thereof, are arranged inside the blade airfoil In the region of the feed hole provision is made for a planar, or virtually planar, stiffening element which reaches beyond the immediate surrounds of the feed hole for reducing peaks of mechanical stress.

BRIEF DESCRIPTION OF THE DRAWINGS

The invention shall subsequently be explained in more detail based on exemplary embodiments in conjunction with the drawing. All elements which are not essential for the direct understanding of the invention have been omitted. Like elements are provided with the same designations in the various figures. In the drawing.

DETAILED DESCRIPTION OF THE PREFERRED EMBODIMENTS

Introduction to the Embodiments

It is therefore the object of the invention to create a cooled blade for a gas turbine, in which, via the reduction of the service-life-curtailing stress peaks, improvements in the vibration behavior are also achieved.

The object is achieved by means of the entirety of the features of claim 1. It is preferable for the invention that the peaks in mechanical stresses are reduced by the use of a planar, or essentially planar, stiffening element which reaches beyond the direct vicinity of the feed hole. With the extensive reach of the stiffening element, not only is the local stress on the edge of the hole opening reduced but at the same time the vibration behavior of the blade is improved because as a result of the stiffening element the natural frequency of the first flap vibration mode of the blade is increased.

In one development of the invention, the shank has a concave and a convex side, and the feed hole opens into the outside space on the convex side of the shank.

In another development, the blade has a center plane which lies transversely to the machine axis, the feed hole opens into the outside space on the one side of the center plane, and the stiffening element is formed symmetrically to the center plane and also encompasses the mouth of the feed hole. In particular, the stiffening element is formed as a plateau in this case.

According to a further development of the invention, the stiffening element extends in the direction of the longitudinal axis of the blade over the entire length of the shank and has an approximately trapezoidal edge contour.

In another development, a platform is formed at the boundary between the shank and the blade airfoil, and the stiffening element directly adjoins the underside of the platform and has rounded corners on the opposite side.

The stiffening element is preferably formed on the shank of the blade and consists of the same material as the blade.

DETAILED DESCRIPTION

Figures 1, 2:
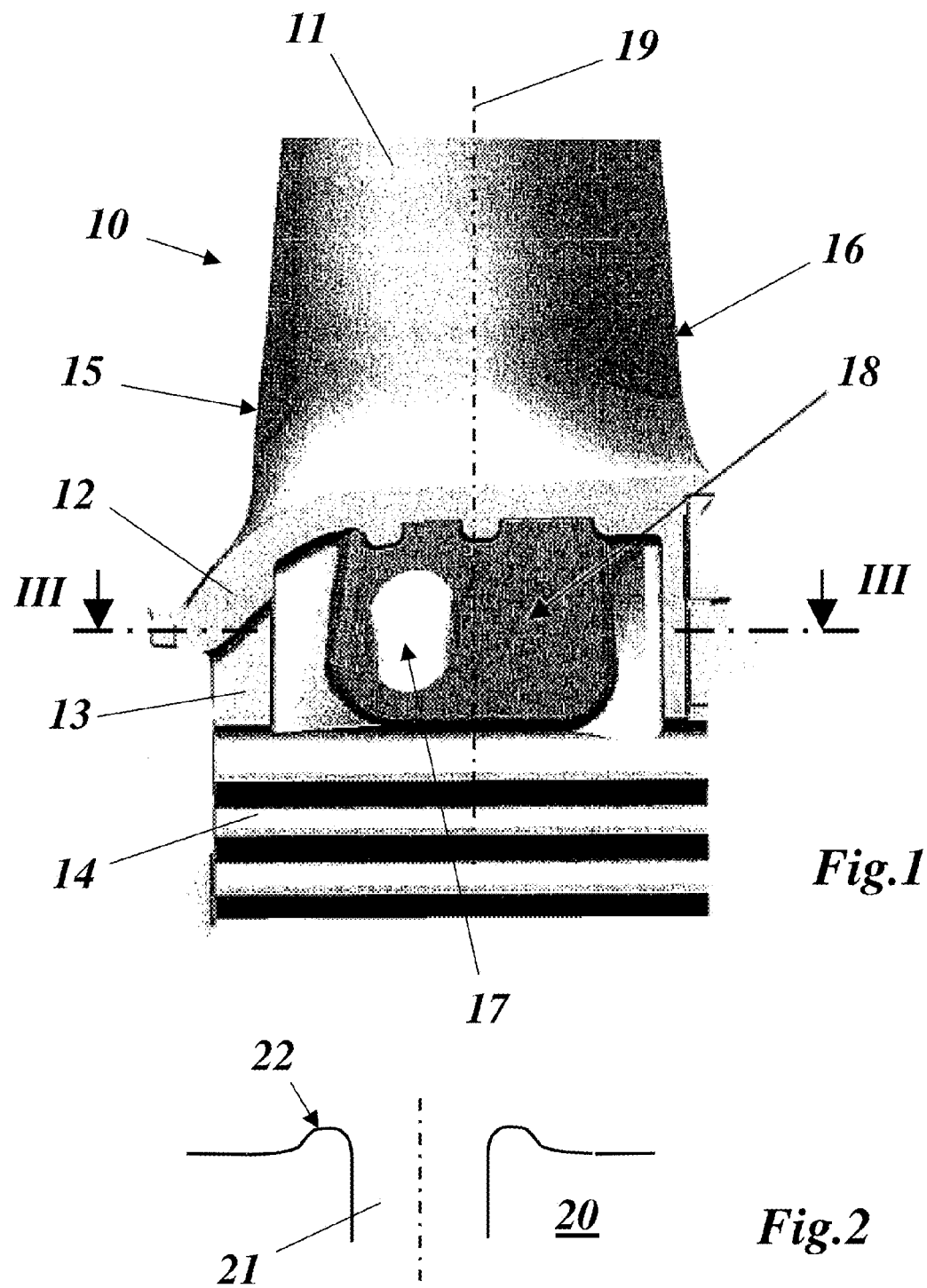
FIG. 1 shows in a side view the lower part of a gas turbine blade with a stiffening element arranged on the shank, according to an exemplary embodiment of the invention.
FIG. 2 shows in cross section the surrounds of a feed hole for cooling air which is provided on the shank of a blade, as is known from the prior art.
Figure 3:
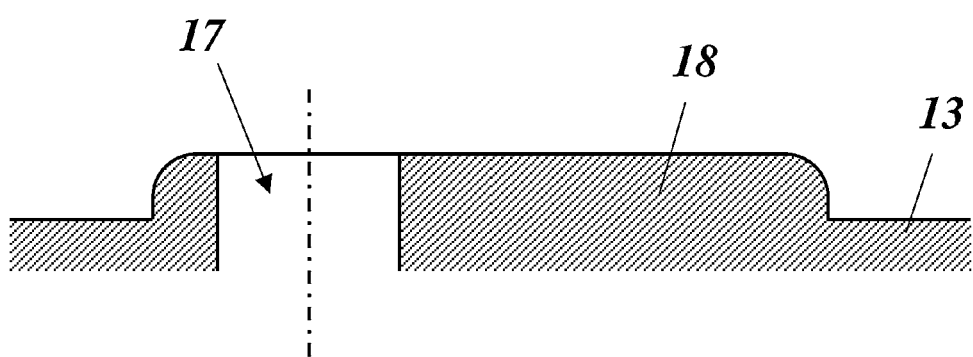
FIG. 3 shows the cross section through the stiffening element of FIG. 1 in the plane III-III which is indicated there.

In FIGS. 1 and 3, a blade according to an exemplary embodiment of the invention is reproduced. The blade 10, of which only the lower part is shown, comprises a blade airfoil 11 which extends in the longitudinal direction of the blade along a longitudinal axis 19. The blade airfoil 11, which is delimited by a leading edge 15 and a trailing edge 16 in the flow direction, merges into a shank 13 at the lower end beneath a platform 12 which forms the inner wall of the hot gas passage, the shank terminating in a customary blade root 14 with a firtree-shaped cross-sectional profile by which the blade 10 can be fastened on a blade carrier, especially on a rotor disk, by inserting into a corresponding axial slot (see, for example, FIG. 1 of U.S. Pat. No. 4,940,388 cited in the introduction).

Cooling passages, which are not shown, extend inside the blade airfoil 11 for cooling the blade 10 and are supplied with a cooling medium, particularly cooling air, via a feed hole 17 which is arranged on the shank 13 at the side. The shank 13, similar to the blade airfoil 11, has a concave and a convex side. In FIG. 1, the convex side faces the viewer. The feed hole 17, which extends obliquely upwards into the interior of the blade airfoil 11, opens into the outside space on the convex side of the shank 13.

In order to now reduce the mechanical stresses which are associated with the mouth of the feed hole 17 and at the same time to positively influence the vibration behavior of the blade 10, provision is made around the mouth of the feed hole 17 for a planar or virtually planar—that is to say not formed consistently planar over the entire surface—stiffening element 18 which reaches beyond the direct vicinity of the feed hole 17, which stiffening is formed integrally on the shank 13 and consists of the same material as the blade 10. As is to be seen from the cross section of the stiffening element 18 which is shown in FIG. 3, the stiffening element 18 is formed as a large-area plateau, and—from the opening of the feed hole 17 arranged to the left of the center plane 19—reaches far beyond the center plane 19 of the blade 10 so that the stiffening element 18 is formed symmetrically to the center plane 19 and also encompasses the mouth of the feed hole 17.

In the direction of the longitudinal axis 19 of the blade 10, the stiffening element 18 extends practically over the entire length of the shank 13. It has an approximately trapezoidal edge contour, directly adjoins the underside of the platform 12 and has rounded corners on the opposite side.

With the stiffening elements 18, not only are stress peaks relieved on the edge of the feed hole 17 but the vibration behavior of the blade 10 is also improved since the stiffening element 18 leads to an increase of the natural frequency of the first flap vibration mode of the blade 10 on the convex side of the blade root 13, 14. This increase contributes to creating a blade which is free of resonances with the primary excitation mechanisms of the machine.

The conventional way for increasing the first natural flap vibration would be to increase overall the thickness of the blade shank. This, however, would lead to a significant increase of the blade mass. Another way would be to modify the blade airfoil or the outer shroud segment, which, however, would lead to a deterioration of the aerodynamic characteristic of the blade.

The present solution with the local, carefully designed reinforcing element on the convex side of the shank improves the vibration behavior of the blade with a minimum of mass increase and minimizes the mechanical stresses at the feed hole for the cooling air.

LIST OF DESIGNATIONS

10 Blade (gas turbine)
11 Blade airfoil
12 Platform (inner)
13, 20 Shank
14 Blade root
15 Leading edge
16 Trailing edge
17, 21 Feed hole (cooling)
18 Stiffening element
19 Longitudinal axis (center plane)
22 Bead

What is claimed is:

1. A blade for a gas turbine, comprising a blade airfoil which extends in a blade longitudinal direction and at a lower end merges into a shank, having a concave and a convex side, which terminates in a blade root for fastening the blade on a blade carrier, wherein devices for cooling the blade, which are supplied with a cooling medium, via a feed hole arranged on the shank that opens into an outside space on the convex side of the shank, are arranged inside the blade airfoil, the blade having a center plane which lies transversely to a machine axis, and the feed hole opens into the outside space on the one side of the center plane wherein in a region of the feed hole provision is made for a generally planar stiffening element which reaches beyond immediate surrounds of the feed hole for reducing peaks of mechanical stress, the stiffening element is formed symmetrically to the center plane and also encompasses the mouth of the feed hole, and extends over an entire length of the shank in the blade longitudinal direction and has an approximately trapezoidal edge contour.

2. The blade as claimed in claim 1, wherein the stiffening element is formed as a plateau.

3. The blade as claimed in claim 1, wherein the stiffening element is formed on the shank of the blade and consists of the same material as the blade.

4. A blade for a gas turbine, comprising a blade airfoil which extends in a blade longitudinal direction and at a lower end merges into a shank, having a concave and a convex side, which terminates in a blade root for fastening the blade on a blade carrier, wherein devices for cooling the blade, which are supplied with a cooling medium, via a feed hole arranged on the shank that opens into an outside space on the convex side of the shank, are arranged inside the blade airfoil, the blade having a center plane which lies transversely to a machine axis, and the feed hole opens into the outside space on the one side of the center plane wherein in a region of the feed hole provision is made for a generally planar stiffening element which reaches beyond immediate surrounds of the feed hole for reducing peaks of mechanical stress, the stiffening element is formed symmetrically to the center plane and also encompasses the mouth of the feed hole, and extends over an entire length of the shank in the blade longitudinal direction and has an approximately trapezoidal edge contour and wherein a platform is formed at the boundary between the shank and the blade airfoil, and the stiffening element, having first and second sides, directly adjoins the underside of the platform at the first side and has rounded corners on the second side opposite thereto.

* * * * *